United States Patent [19]

Mollat

[11] Patent Number: 4,755,007
[45] Date of Patent: Jul. 5, 1988

[54] ANTI-SKID BRAKING CONTROL DEVICE INCLUDING CAM AND OPPOSITELY DISPOSED, RECIPROCATING PISTONS

[76] Inventor: Edmund C. Mollat, 470 Dundee Ave., Milpitas, Calif. 95035

[21] Appl. No.: 49,154

[22] Filed: Jul. 30, 1987

[51] Int. Cl.[4] .............................................. B60T 15/58
[52] U.S. Cl. ...................................... 303/61; 303/116; 303/117; 137/625.68
[58] Field of Search ...................... 303/61, 116, 10–12, 303/113, 114, 115, 117; 137/625.35, 625.34, 625.68

[56] References Cited

U.S. PATENT DOCUMENTS

| | | | |
|---|---|---|---|
| 3,004,555 | 10/1961 | Haberland | 137/625.68 |
| 3,361,487 | 1/1968 | Vriend | 303/61 X |
| 3,466,098 | 9/1969 | Pieren et al. | 303/61 X |
| 3,601,452 | 8/1971 | Brunner | 303/61 X |
| 3,731,979 | 5/1973 | Mikaila | 303/61 X |
| 3,756,666 | 9/1973 | Leiber | 303/116 X |
| 3,942,843 | 3/1976 | Tobiasz | 303/61 X |
| 4,109,970 | 8/1978 | Ashby, Jr. | 303/116 |
| 4,113,323 | 9/1978 | Haney | 303/61 X |
| 4,260,198 | 4/1981 | Cook | 303/117 X |
| 4,354,715 | 10/1982 | Farr et al. | 303/116 |
| 4,372,620 | 2/1983 | Mekosh, Jr. | 303/61 X |
| 4,480,877 | 11/1984 | Resch | 303/61 X |
| 4,557,294 | 12/1985 | Brunner | 137/625.68 |

Primary Examiner—Douglas C. Butler

[57] ABSTRACT

An hydraulic anti-skid braking device to produce pulsating or "on and off" operation (intermittent control) of a pair of brakes connected to the front and rear brakes of a motor vehicle. The device includes a pair of pistons each piston including a completely radially extending through-passage, and off-set and bleed portions.

1 Claim, 1 Drawing Sheet

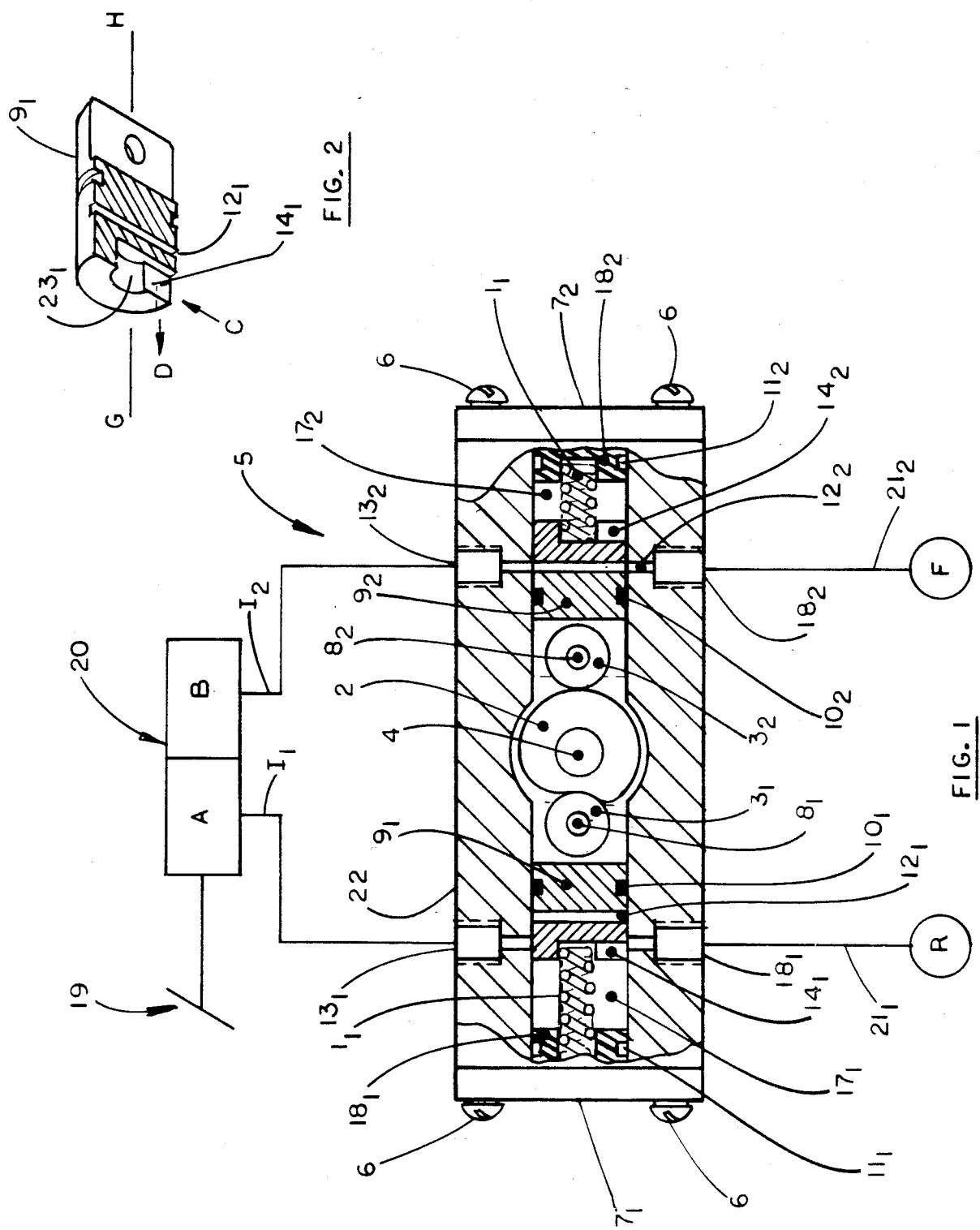

1

ANTI-SKID BRAKING CONTROL DEVICE INCLUDING CAM AND OPPOSITELY DISPOSED, RECIPROCATING PISTONS

BACKGROUND OF THE INVENTION

The present invention relates to hydraulic anti-skid braking systems for vehicles of the kind in which the vehicle brakes are pulsed or pumped to reduce the possibility of wheel lock-up. The latest and probably most valuable invention in the automotive market today is the introduction of the anti-lock braking system. It is by far the most important safety feature in automobiles today and may be mandatory in the cars of tomorrow as the safety belt today is. The systems installed in today's cars are the more complex versions, where sensors are installed in each wheel to detect the occurrence of a skid or incipient skid or lock-up condition. In one example of the prior art, information that sensors gather causes a high pressure hydraulic pump to reduce the pressure in the wheel that is just about ready to skid. In this manner, the wheels are allowed, in a controlled fashion, to be relieved of pressure from the brake shoe or pad in order to rotate again, albeit in a very short period of time. As soon as the wheels start to rotate, the computer again tells the hydraulic pump to apply pressure to the brakes in order to stop the wheels from rotating. This sequence is repeated normally 4 times/second. It is known that the maximum braking action is achieved just before the wheels skid on a surface. In view of the level of complexity of the devices now being offered in the marketplace of which applicant is aware, these "off-the-shelf" devices are not readily retrofitable on vehicles purchased without one from the factory. This device being applied for in this application will achieve the same effect as the computer controlled one but will perform anti-skid control in a more economical and retrofitable manner.

The instant invention differs from the prior art in that the instant system avoids the complexities of the valving arrangements of the prior art. The simplification is accomplished by reducing the number of parts of the system and by relying upon an improved piston for performing the critical functions. The instant system is easily retrofitable to existing automobiles equipped with the conventional tandem hydraulic cylinder.

SUMMARY OF THE INVENTION

The purpose of the present invention is to provide an improved anti-lock hydraulic brake control system with a pair of unique reciprocating pistons wherein the "valves" are built into the pistons.

Another object of the present invention of the kind described is to provide a conventional hydraulic brake system with an easily retrofittable anti-lock control device wherein the operator of the foot brake pedal does not feel the pulsing or pumping of the brakes as the anti-skid control device is pulsing or pumping the fluid in the brake pressure lines.

It is the intention of the instant system to maintain the wheels at "peak braking" action as long as possible or to keep as many "peaks" as possible during the process of braking to achieve or maintain the maximum braking without skidding.

BRIEF DESCRIPTION OF THE DRAWINGS

FIG. 1 is a schematic view showing the anti-lock brake control device of the instant invention in a dual brake system. The right side of FIG. 1 depicts the position of a piston when the brakes are activated while the left side of FIG. 1 depicts the non-aligned position of a piston where the pressure in the wheel brake is being relieved.

FIG. 2 is view of hydraulic piston per-se shown in a cutaway view to show the internal flow passages therein.

COMBINED DESCRIPTION OF THE PREFERRED EMBODIMENT AND MODE OF OPERATION

FIG. 1 of the drawing shows a hydraulic brake system with a tandem master cylinder 20 with front (B) and rear (A) master cylinders which are actuated by a brake pedal 19. The anti-skid brake control device 5 of the instant invention is installed between the master cylinder 20 and the rear (R) and front (F) wheel brakes of the motor vehicle. The dual or two-circuit braking system of FIG. 1 includes separate fluid brake circuits $I_1$ and $I_2$ connected to the inlets $13_1$ and $13_2$ respectively, of the hydraulic device. A pair of outlet ports or passages $18_1$, and $18_2$ are connected from the hydraulic anti-lock device 5 to the separate lines $21_1$ and $21_2$, respectively, of the rear and front brakes circuits $I_1$ and $I_2$ respectively. Each of the piston arrangements generally indicated at $9_1$ and $9_2$ of FIG. 1 is substantially identical. Each of the pistons $9_1$ and $9_2$, in the most forward position, aligns its radially extending or through-passages $12_1$ and $12_2$ with that of the ports $13_1$ and $13_2$ connected to the fluid circuits $I_1$ and $I_2$ from master cylinder 20 and aligns the noted through-passages $12_1$, $12_2$ with the output ports $18_1$, $18_2$ to the wheel brakes R and F, respectively. While in this forward position, the brakes R and F are "on" for a fraction of a second. Tests have shown that 250 milliseconds is the optimum frequency for cycling of the piston assemblies $9_1$, $9_2$ between open and closed positions. As is evident from FIG. 1, as the respective piston ($9_1$ or $9_2$) moves back from its forward position to its rearward position, through-passage ($12_1$ or $12_2$) within the piston becomes misaligned with the inlet ($13_1$,$13_2$) and outlet ($18_1$,$18_2$) ports of the device 5 to thus cut off or isolate the flow of master cylinder fluid to the respective brake. As the piston moves further back, the off-set portion of the piston generally indicated at $14_1$,$14_2$ is exposed to relieve brake pressure from the wheel brakes R,F. Upon the continued movement of the pistons $14_1$, $14_2$ backward, the piston/expansion chamber $17_1$, $17_2$ enlarges due to the receding piston. The brake fluid from pressure lines $21_1$, $21_2$ of the brakes R,F is evacuated into the expansion chamber $17_1$, $17_2$. The brake fluid from the wheel brakes R,F is evacuated into the expansion chamber $17_1$, $17_2$ which is continuously enlarging to accommodate the volume of the fluid from the wheel brakes R,F. Because the fluid is being evacuated from the brake lines $21_1$, $21_2$ leading from the brakes R,F, the pressure to the brakes is relieved.

The cycle of pressurization and evacuation is repeated every 250 milliseconds (¼ second). This frequency of "on/off" of the brakes precludes the wheels from achieving any lock-up position because the wheels never stay in any position long enough to lock. The oscillating motion of the pistons $9_1$, $9_2$ aligns and misaligns the passages allowing alternate application and release of the brakes, i.e., intermittent brake supply and release.

The oscillation or reciprocating motions of the pistons are effected by the revolution of a cam 2. The cam has a lobe (a depression on the wheel) which allows the cam follower ($3_1, 3_2$) to rise up and down on this depression on the cam thus pushing the pistons ($9_1, 9_2$) back and forth. The speed of the revolution of the cam determines the speed of the oscillating motion of the pistons. The cam 2 includes a cam shaft or the like at 4.

In order to preclude excessive loads on the piston seat, the cam, and the motor, a cam follower ($3_1, 3_2$) is used to rotate freely while attached to the piston $9_1, 9_2$ with the cam follower pin $8_1, 8_2$. In this manner, the contact points of the cam follower on the cam and the piston will be in the form of a rolling motion rather than a "scrubbing" motion which would cause premature failure of the cam and piston seat. This is standard mechanical engineering practice.

In FIG. 2 of the present invention, the expansion flow path C-D is shown. The mechanism used to actuate the cam 2 of the instant invention is not critical to the invention. Numerous prior art discloses the drive mechanism which forms no part of the invention herein for which a patent is sought. For example, the system may be powered by an electric motor geared down to improve torque to cause rotation of cam 2 which alternately applies and releases the brakes R,F by the alternate forward and backward motion of the pistons $9_1, 9_2$ as the pistons reciprocate within chambers of the housing 22 of the device 5. The system may be activated by connecting it to the brake light circuit (not shown) so that the system is on every time the brake pedal is applied. Also, the anti-lock brake device 5 of FIG. 1 may be coupled to a sensor or series of sensors with the brake lights so that the system operates when the proper combination of events and conditions, as desired, takes place. The present system is considered to be versatile in that the frequency of oscillation may be varied by speed or the use of a multi-lobe cam. The frequency may also be variable during usage to conform to road surface conditions with the use of sensors if desired. A higher or lower rate of frequency of oscillation may be used depending on whether the road is asphalt, concrete, gravel, icy, or muddy, or even when days are hot versus cold evenings. The pistons $9_1, 9_2$ may be driven to oscillation by an external power source, normally by an external power source, normally on a 12 volt electric motor, by vacuum activation or any other appropriate mechanical means not relevant to the present invention. The motor shaft is connected to a single lobe cam (or multi-lobe if preferred) activating the pistons to oscillate back and forth.

With reference to FIG. 2 of the drawing, the piston $9_1$ includes multiple ports. It should be understood that a description of piston $9_1$ also pertains to the description for corresponding piston $9_2$. The piston $9_1$ includes radially extending port $12_1$ and an off-set portion and bleed-off portion generally indicated at $14_1$. The bleed-off portion is formed by removing a portion of the periphery of the piston or spool from its periphery which piston slidably engages the inner wall of the chambers within housing 22. The bleed-off portion forms a recess or cavity of indentation which is axially and radially formed. The radial portion extends to a central portion 23 which is concentric with the longitudinal axis G-H of the piston $9_1$. The cavity 23 extends toward but does not meet the through-passage or radial port $12_1$.

Regarding the operation of the structure of FIGS. 1-2, when a driver steps on the brakes, the master cylinder pressurizes the fluid in the brake lines causing the brake pads and/or shoes to exert pressure on the motor or brake drums thereby stopping its revolving motion. It should be noted that as the piston $9_1, 9_2$ continues its rearward stroke thus increasing the volume of the expansion chamber $17_1, 17_2$, the retreating piston causes a partial vacuum to occur. This partial vacuum allows more of the brake fluid to be evacuated via $14_1, 23_1$, flow path C-D to the expansion chamber $17_1$ so that a portion of the pressure in the brake is relieved. On the return stroke of the piston $9_1, 9_2$, brake fluid accumulated in the expansion chamber is pushed back into the brake lines by the piston $9_1, 9_2$. As the pistons $9_1, 9_2$ are cycled back and forth, the brakes are never on and off longer than $\frac{1}{8}$ of a second at any time thereby giving the maximum braking action without allowing the wheels to skid. In addition to the above, it should be noted that FIG. 1 includes return springs $1_1, 1_2$ used to return the pistons $9_1, 9_2$ to the normal position when the brakes are off and when the anti-skid system is not in operation. The return springs $1_1, 1_2$ are located inside the piston-/expansion chamber $17_1, 17_2$ defined by the end of the piston head of pistons $9_1, 9_2$ and the abutment members $18_1, 18_2$ of the end caps $7_1, 7_2$. Screws 6 hold the end caps $7_1, 7_2$ in place. The cam 2 is of the single lobe type with a slow rise designed to minimize the load on the drive motor (not shown) when the device 5 is working. Elements $3_1, 3_2$ are cam followers used to minimize the load on cam 2 during its cycling operation by its rolling motion. The cam 2 of FIG. 1 includes a motor shaft 4 fixed to the cam by a pin to a effect turning motion when the motor (not shown) is on. The high pressure end caps $7_1, 7_2$ are used to seal off the brake fluid from each end of the anti-skid housing 22. The end caps $7_1, 7_2$ hold the return springs $1_1, 1_2$ in place via abutments $18_1, 18_2$ thereof. Each of the cam followers $3_1, 3_2$ includes a respective cam follower pins $8_1, 8_2$ for attaching the cam follower to its respective piston.

FIG. 1, in addition, includes O-ring and O-ring grooves at $10_1, 10_2$ wherein these O-rings inside the grooves are used to keep the brake fluid contained. Similarly, the portions $18_1, 18_2$ of the end caps $7_1, 7_2$ include O-rings/grooves at $11_1, 11_2$. Inlets $13_1, 13_2$ of the device 5 are connected to brake circuits $I_1, I_2$ by conventional brake line fittings or couplings.

I claim:

1. An anti-lock hydraulic brake control device (5) including a pair of inlet ports ($13_1, 13_2$) connected to a pair of brake circuits ($I_1, I_2$) from separate outlets of a tandem master cylinder (20) actuated by a brake pedal (19), the device (5) including within its housing (22) a pair of alternately reciprocating pistons ($9_1, 9_2$) with pin-connected cam followers ($3_1, 3_2$) attached thereto, the followers situated for alternate engagement with a driven cam (2) located between said cam followers ($3_1, 3_2$), each of said pistons ($9_1, 9_2$) including a respective completely radially oriented through-passage ($12_1, 12_2$) adapted in one forward position to register in fluid alignment the respective inlet port ($13_1, 13_2$) of the device (5) and an outlet port ($18_1, 18_2$) connected to rear (R) and front (F) brakes of the vehicle respectively and adapted in a second rearward position to isolate the said inlet port ($13_1, 13_2$) from fluid communication with the through-passage ($12_1, 12_2$), each piston ($9_1, 9_2$) also including therein off-set and bleed off configurations or portions for relieving brake pressure from the outlet port ($18_1, 18_2$) comprising an axially and radially flow-through passageway (D-C) partially formed by an elongated groove or recess or indentation in the outer periphery of the piston which passageway leads to a central relief chamber or cavity ($23_1, 23_2$) in the piston, the off-set and bleed off portions of the piston ($9_1, 9_2$) and its cavity being configured to connect the respective brake (R,F) to an associated piston/expansion relief or release chamber ($17_1, 17_2$) situated between one end of said respective piston ($9_1, 9_2$) and an abutment ($18_1, 18_2$) of a respective end cap ($7_1, 7_2$) of the single housing (22) of the brake control device (5), wherein each of said pistons ($9_1, 9_2$) directly slides on an inner peripheral chamber surface within a chamber of said housing (22) and is of a single, one-piece construction with the supply through-passage ($12_1, 12_2$) being axially spaced by a predetermined amount from the off-set portion of the respective piston ($9_1, 9_2$), each said piston/expansion chambers ($17_1, 17_2$) including a respective coil spring ($1_1, 1_2$) with opposite ends located within said respective abutment ($18_1, 18_2$) of the said respective end cap ($7_1, 7_2$) and a recess of the other end of the respective said piston ($9_1, 9_2$), wherein rotation of said cam (2) causes alternate application and release of the respective brakes (R,F) by one of said brakes being applied by appropriate alignment of the through-passage ($12_1, 12_2$) and respective brake with the supply inlet port ($13_1, 13_2$) while the other brake is being released by appropriate alignment of the other brake to the piston/expansion chamber ($17_1, 17_2$) after the supply inlet port ($13_1, 13_2$) of the associated other brake has been isolated from the through-passage ($12_1, 12_2$) by sliding movement of the piston away from the position in which the through-passage is open to the master cylinder.

* * * * *